(12) United States Patent
Mock et al.

(10) Patent No.: US 8,472,598 B2
(45) Date of Patent: Jun. 25, 2013

(54) PREPAYING USAGE TIME FOR ANOTHER COMMUNICATION DEVICE

(75) Inventors: Von A. Mock, Boynton Beach, FL (US); David J. Hayes, Lake Worth, FL (US)

(73) Assignee: Motorola Mobility LLC, Libertyville, IL (US)

( * ) Notice: Subject to any disclaimer, the term of this patent is extended or adjusted under 35 U.S.C. 154(b) by 1523 days.

(21) Appl. No.: 11/686,342

(22) Filed: Mar. 14, 2007

(65) Prior Publication Data

US 2008/0130849 A1 Jun. 5, 2008

Related U.S. Application Data

(60) Provisional application No. 60/867,977, filed on Nov. 30, 2006.

(51) Int. Cl.
*H04M 15/00* (2006.01)

(52) U.S. Cl.
USPC ............... 379/114.2; 379/114.16; 379/114.17

(58) Field of Classification Search
USPC .................. 379/111, 114.01, 114.03, 114.17, 379/114.18, 114.2, 114.16; 455/405–408
See application file for complete search history.

(56) References Cited

U.S. PATENT DOCUMENTS

| | | | |
|---|---|---|---|
| 6,564,047 B1 * | 5/2003 | Steele et al. ................... | 455/405 |
| 6,947,723 B1 | 9/2005 | Gurnani et al. | |
| 6,987,844 B2 * | 1/2006 | Himmel et al. ............. | 379/114.2 |
| 7,197,321 B2 * | 3/2007 | Erskine et al. ............. | 455/456.1 |
| 7,280,645 B1 | 10/2007 | Allen et al. | |
| 7,437,144 B1 | 10/2008 | Andresen et al. | |
| 7,437,181 B2 | 10/2008 | Simmons | |
| 7,761,082 B2 * | 7/2010 | Mongazon-Cazavet et al. ............... | 455/405 |
| 2002/0103762 A1 | 8/2002 | Lopez et al. | |
| 2002/0106064 A1 | 8/2002 | Bekkevold et al. | |
| 2003/0026404 A1 * | 2/2003 | Joyce et al. ............... | 379/144.01 |
| 2003/0045267 A1 * | 3/2003 | Himmel et al. ............... | 455/406 |
| 2003/0053609 A1 * | 3/2003 | Risafi et al. ................. | 379/114.2 |
| 2003/0086545 A1 * | 5/2003 | Ruckart et al. ............. | 379/114.2 |
| 2003/0125968 A1 | 7/2003 | Uppal | |
| 2004/0141601 A1 * | 7/2004 | Cai et al. ..................... | 379/114.2 |

(Continued)

FOREIGN PATENT DOCUMENTS

| | | |
|---|---|---|
| EP | 1271911 B1 | 5/2005 |
| GB | 2322771 A | 9/1998 |

(Continued)

OTHER PUBLICATIONS

Sivalingam, et al., Sharing Prepaid Mobile Telephony Credit Among a Group, U.S. Appl. No. 11/671,559, filed Feb. 6, 2007, 26 pgs.

(Continued)

*Primary Examiner* — Binh Tieu (57) ABSTRACT

A method of prepaying for usage time for a communication device can include increasing an available balance of a prepaid account linked to a communication device of a first user by a designated amount responsive to a request from a second user (910) and allocating a portion of the available balance of the prepaid account that is attributable to the designated amount for communicating with a designated user (915). The method further can include paying charges resulting from communications between the communication device of the first user and the designated user from the allocated portion of the available balance of the prepaid account (925).

17 Claims, 3 Drawing Sheets

U.S. PATENT DOCUMENTS

| | | |
|---|---|---|
| 2004/0166878 A1 | 8/2004 | Erskine et al. |
| 2004/0249649 A1 | 12/2004 | Stratton et al. |
| 2006/0078100 A1 | 4/2006 | Risafi et al. |
| 2007/0140450 A1* | 6/2007 | Babi et al. ............... 379/114.2 |
| 2008/0096524 A1 | 4/2008 | True et al. |
| 2008/0119162 A1 | 5/2008 | Sivalingam et al. |

FOREIGN PATENT DOCUMENTS

| | | |
|---|---|---|
| WO | 0106753 A | 1/2001 |
| WO | 0186933 A | 11/2001 |
| WO | 02060172 A | 8/2002 |
| WO | 2007032996 A | 3/2007 |
| WO | 2007120117 A | 10/2007 |

OTHER PUBLICATIONS

Patent Cooperation Treaty, "PCT Search Report and Written Opinion of the International Searching Authority" for International Application No. PCT/US2007/082971, Mar. 26, 2008, 13 pages.

Patent Cooperation Treaty, Notification Concerning Transmittal of International Preliminary Report on Patentability (Chapter 1 of the Patent Cooperation Treaty), for International Application No. PCT/US2007/084622, Jun. 11, 2009, 10 pages.

* cited by examiner

| Amy | $0.00 |
| Bob | $0.00 |
| Mom | $10.00 |
| Dad | $15.00 |

Able

Baker

Charlie

Teen 1   $15.00

Alisa

Barbara

Cynthia

Teen 1   $10.00

Profile Administration

Dad's Profile

| Device: | Allowed to Use Purchased Resources: |
| Teen 1 | Mom's Mobile |
| | Teen Mobile 2    8:00 a.m. – 6:00 p.m. |
| | Home Landline |
| | Work Phone 1 |
| | Work Phone 2 |
| | Emergency Numbers |
| | Dad's Mobile |

Able

Baker

Charlie

Teen 1   $15.00   ← 705

| Amy | $15.00 (P) |
| Bob | $15.00 (P) |
| Dad | $15.00 (P) |
| Mom | $10.00 |

PREPAYING USAGE TIME FOR ANOTHER COMMUNICATION DEVICE

CROSS REFERENCES TO RELATED APPLICATIONS

This application claims benefit of U.S. provisional patent application Ser. No. 60/867,977, filed Nov. 30, 2006, which is herein incorporated by reference.

BACKGROUND OF THE INVENTION

1. Field of the Invention

The present invention generally relates to communication devices that operate in conjunction with prepaid accounts.

2. Background of the Invention

The use of prepaid accounts with communication devices has grown substantially. A prepaid account is a type of financial account from which charges incurred for the usage of a communication device linked to the prepaid account are paid. Whereas with a traditional, or non-prepaid, account, a subscriber receives a bill for charges already incurred, with a prepaid account, the account must be funded before the communication device linked with that account can be used. Any charges arising from usage of the communication device linked with the prepaid account are debited from the prepaid account when incurred.

While prepaid accounts can be used in any of a variety of different situations, such accounts often are opened by a parent on behalf of a child. The child can utilize the communication device only to the extent that funds are available in the prepaid account. This prevents the user of the communication device from incurring expenses beyond an anticipated amount or beyond the user's ability to pay, i.e., beyond the balance available on the prepaid account.

In some cases, the user of the communication device may incur enough charges that the prepaid account is depleted, leaving the communication device unavailable for further use until the prepaid account is replenished. In the case of a parent-child relationship, for example, the child may exhaust the prepaid account very quickly. The communication device will not be available for communications, i.e., calls or other messages, whether with the parents or others, until such time that funds are added to the prepaid account.

SUMMARY OF THE INVENTION

The present invention relates to a method of prepaying for usage time for a communication device. The method can include increasing an available balance of a prepaid account linked to a communication device of a first user by a designated amount responsive to a request from a second user and allocating a portion of the available balance of the prepaid account that is attributable to the designated amount for communicating with a designated user. The method also can include paying charges resulting from communications between the communication device of the first user and the designated user from the allocated portion of the available balance of the prepaid account.

Paying charges can include decreasing the allocated portion of the available balance of the prepaid account only for charges incurred for communications initiated either by the first user or the designated user. Paying charges also can include paying charges resulting from communications between the communication device of the first user and the designated user only from the allocated portion of the available balance of the prepaid account if at least one additional condition associated with the designated user is met.

The method can include paying charges resulting from communications between the communication device of the first user and a non-designated user only from a portion of the prepaid account not allocated to communications with designated users. Available balance information for the prepaid account can be sent to the communication device of the first user, a communication device of the second user, or both. The available balance information can specify, at least in part, the allocated portion of the available balance that remains in the prepaid account.

The designated user can be specified as any user having a defined telephone number, any user located within a selected geographic area, as the second user, or any combination thereof. The designated user also can be specified as any user within a predetermined number of hops of a social network of the first user or the second user. An input also can be received from the second user that specifies the designated user.

The present invention also can relate to a processing node within a communication network. The processing node can include an account manager and a data store. The account manager can allocate a portion of an available balance of a prepaid account linked with a communication device of a first user for communicating with a designated user. The data store can include account information for the prepaid account. The account information can specify the portion of the prepaid account allocated to communicating with the designated user and a portion of the prepaid account that is allocated to communicating with a non-designated user.

The account manager can decrease the portion of the prepaid account allocated to communicating with the designated user according to charges incurred for communications between the communication device of the first user and the designated user. The account manager also can decrease the portion of the prepaid account that is allocated to communicating with the non-designated user according to charges incurred for communications between the communication device of the first user and the non-designated user. In that case, the account manager does not decrement the portion of the prepaid account allocated to communicating with the designated user. The account manager also can decrease the portion of the prepaid account that is allocated to communicating with the designated user only according to charges incurred for communications initiated either by the first user or the designated user.

The account manager can allocate the portion of the prepaid account to communicating with the designated user responsive to a request from a second user. The account manager further can determine that the second user is the designated user. The account manager also can send available balance information for the prepaid account to at least one of the mobile device of the first user or a mobile device of the second user, wherein the available balance information specifies the allocated portion of the available balance that remains in the prepaid account.

The present invention further can relate to a communication device including a transceiver disposed within the communication device receiving an available balance of a prepaid account linked with a different communication device and a portion of the available balance that is allocated to communicating with a designated user. The communication device also can include a display and a controller operatively coupled to the transceiver and the display. The controller can cause the available balance and the allocated portion of the available balance of the prepaid account to be presented upon the display.

In one arrangement, the portion of the available balance allocated to communicating with the designated user can be associated with an additional condition. In that case, the controller can cause an indication of the additional condition to be presented upon the display. The controller also can cause profile administration information for the prepaid account associated with the different communication device to be presented upon the display.

The portion of the available balance allocated to communicating with the designated user can be available only for communications having a specified origination point. Accordingly, the controller can cause an indication of the specified origination point to be presented upon the display with the portion of the available balance allocated to communicating with the designated user.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention relates to prepaying for usage time on a communication device. Responsive to a user request, additional funds can be added to a prepaid account of a different user. The additional funds can be earmarked for a particular purpose. For example, the funds can be reserved and, therefore, only be made available to pay charges incurred when the user of the communication device linked with the prepaid account communicates with one or more designated users. That is, the additional funds may only be debited when the user of the communication device linked with the prepaid account communicates with one of the designated users. This allows a portion, or all, of the funds within a prepaid account to be available for a limited purpose, i.e., communicating with selected individuals, while another portion of the prepaid account is available for communicating with non-designated users.

Figure 1:
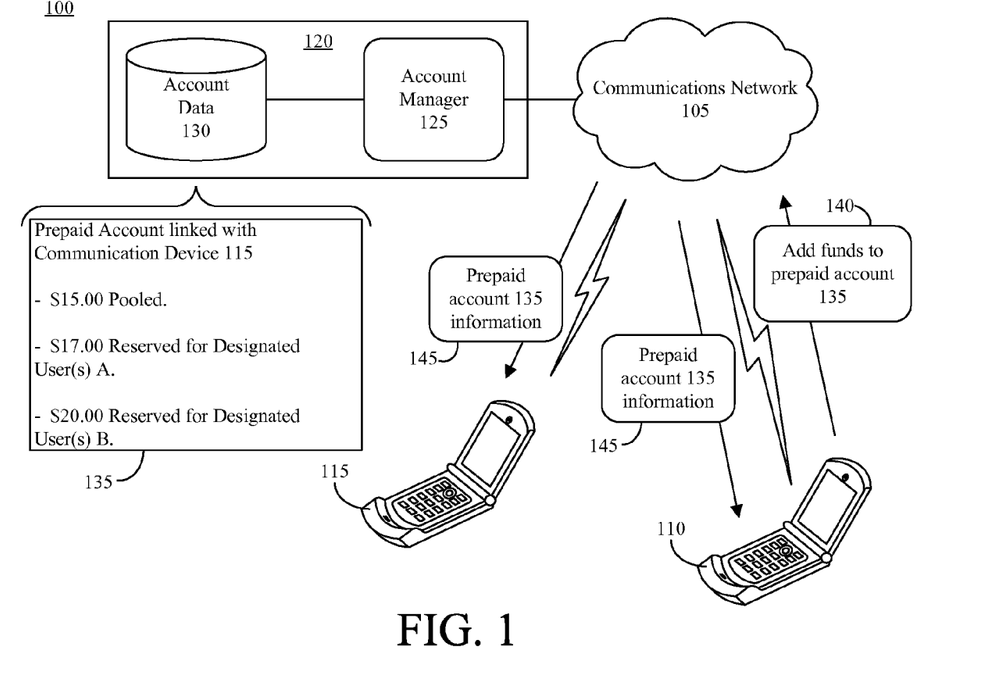
FIG. 1 depicts a block diagram that is useful for understanding the present invention.

FIG. 1 depicts a block diagram of a communications system 100 that is useful for understanding the present invention. The communications system 100 can include a communications network 105, which can comprise, for example, the Internet, the World Wide Web, a wide area network (WAN), a local area network (LAN), a cellular or mobile communications network, a public switched telephone network (PSTN), and/or any other networks or systems over which communication signals can be propagated. In that regard, the communications network 105 can include wired and/or wireless communication links.

The communications system 100 also can include a plurality of communication devices 110 and 115 communicatively linked to the communications network 105. The communication devices 110 and 115 can be mobile stations, such as personal digital assistants (PDAs), mobile telephones, mobile radios, or mobile computers. The communication devices 110 and 115 also can be computers, network appliances, or any other electronic devices that may communicate via the communications network 105. The communication devices 110 and 115 can include suitable operating software and/or applications which cause the communication devices 110 and 115 to function as described herein.

The communications system 100 may further include a network node 120 comprising an account manager 125 and a data storage device including account data 130. The network node 120 can be any processing device that is communicatively linked to the communications network 105 and which can process requests from the communication devices 110 and 115. For example, the network node 120 can be implemented as, or within, a network server, a Web server, a mobile switching center, a base station controller, a base transceiver station, or any other suitable information processing system.

The account manager 125 can manage prepaid user accounts to perform actions including, but not limited to, crediting a prepaid account, debiting a prepaid account, allocating or reserving portions of an available balance of a prepaid account for a special purpose, as well as crediting and/or debiting from pooled and/or allocated portions of prepaid accounts. Funds allocated for a special purpose can be tracked separately from other funds in the prepaid account that are not reserved for a designated purpose. Funds not reserved or allocated as described herein can be referred to as pooled funds.

The account data 130 can specify account information for prepaid accounts including credits, debits, and allocations of funds within prepaid accounts for various purposes to be described herein in further detail. As shown, the account data 130 can include specify information for a prepaid account 135 that is linked with the communication device 115 as well as account information for other communication devices (not shown) and communication device 110.

In operation, a user of a communication device 110, referred to as an administrative user, can cause a request 140 to be sent to the account manager 125 via the communications network 105. The request 140 can be a request to add funds to the prepaid account 135 that is linked with the mobile station 115. Communication device 115 can be associated with, or used by, a user that is different from the administrative user of communication device 110.

As used herein, an administrative user refers to a user or subscriber that is able to add funds to the prepaid account of another user. The administrative user can be a defined role having rights and/or privileges specified as part of a profile maintained within the communications network 105 or the network node 120. These rights and/or privileges can determine which prepaid accounts the administrative user is able to fund or otherwise manage. Alternatively, an administrative user can be any user that issues a request to add funds to the prepaid account of another user and need not have specialized rights or a defined "role".

The request 140 can indicate the amount of money to be added to the prepaid account 135. In one arrangement, the communication device 110, or the account of communication device 110, can be linked with a bank account, a credit card account, or other financial account from which the amount of money specified in request 140 to be added to the prepaid account 135 can be drawn.

The account manager 125 can add the funds to the prepaid account 135 and further reserve the added funds for a particular purpose or use that can be specified by the administrative user, i.e., the user that initiated the request 140 from communication device 110. As such, while the funds are available for use in the prepaid account 135, the funds are reserved for paying charges incurred for communications sent from and/or received by the communication device 115 that conform to the particular purpose for which the funds have been allocated. As used herein, communications can include, but are not limited to, telephone calls, text messages, pages, or any other communication that can be sent or received from a communication device such as a mobile station.

Having received the request 140, the account manager 125 can update the account data 130 as illustrated by the information specified as part of the prepaid account 135. For example, the request 140 can be a request to add $17.00 to the prepaid account 135 and that such money be reserved only for communications between the communication device 115 and a group of one or more designated users, i.e., designated user(s) A. The administrative user may or may not be a member of the designated user(s) A.

The prepaid account 135 further can have $15.00 that is available for pooled usage. That is, the user of the communication device 115 can communicate with any user that has not been designated as belonging to either the group of designated user(s) A or designated user(s) B. Communications with such non-designated users can be debited against the $15.00 of pooled funds available within the prepaid account 135. In addition to the $17.00 that has been allocated for communicating with designated user(s) A, the prepaid account 135 includes $20.00 that is available and has been allocated for communicating with the group of one or more designated user(s) B.

It should be appreciated that the particular way in which a user is specified as a designated user can vary and is not intended to be a limitation of the present invention. In one arrangement, the administrative user of the communication device 110 can specify designated users according to a communication address associated with each designated user. As used herein, a communication address, or simply address, can be a telephone number, an instant messaging address, an electronic mail address, or any other user identifier or designation associated with a communication device or a network destination, to which communications can be sent, directed, or established, and for which the prepaid account 135 can be charged or otherwise billed.

In another arrangement, a designated user can be specified in terms of different attributes such as whether the telephone number associated with the user has a particular area code. For example, all users of a given area code can be determined to be a group of designated users. In another arrangement, if the location of a communication device can be ascertained, i.e., via Global Positioning System (GPS) or the like, the user group can be defined according to the location of the communication device. For example, any user associated with communication device that is located within a predetermined geographic area can be a designated user belonging to a particular group of designated users. In another example, any user having an account that is linked with a communication device having a billing address within a given geographic area or zip code can be a designated user of a particular group of designated users.

In still another arrangement, designated users can be specified in terms of proximity to the user of the communication device 115 in the context of a social network. For example, the set of contacts specified in the administrative user's contacts on his or her communication device also can be maintained within the network 105 or in the network node 120. In that case, a designated user can be any user that is listed in that address book. Such users can be said to be within 1 hop of the user of the communication device 115, which assumes that the administrator knows the user of the communication device 115.

This can be extended to additional hops, i.e., 2 hops, where the designated users can include contacts listed in the address book of a contact that was listed in the administrative user's address book. Any number of hops can be specified, though appreciably, the larger the number, the less likely that the user of the communication device 115 will actually know or have met the designated user(s). It also should be appreciated that designated users can be specified in terms of a number of hops from the address book of the user of the communication device 115.

In addition to being able to flexibly specify designated users and groups of designated users, one or more conditions can be associated with a designated user or a group of designated users as the case may be. These conditions must be met prior to the establishment of any communications between the communication device 115 and the designated users. For example, timing constraints can be associated with a given group of designated users such that communications from the communication device 115 may only be sent to, received from, or established with such designated users between defined hours.

Information 145 regarding the prepaid account 135 can be provide to the communication device 115 as well as to one or more other communication devices such as communication device 110. The prepaid account information 145 allows the administrative user that requested the addition of funds to the prepaid account 135 to view the status of that account. As noted, the administrative user can be accorded rights to add funds to the prepaid account 135 or need not have any special or particular rights allowing such actions.

Figure 2:
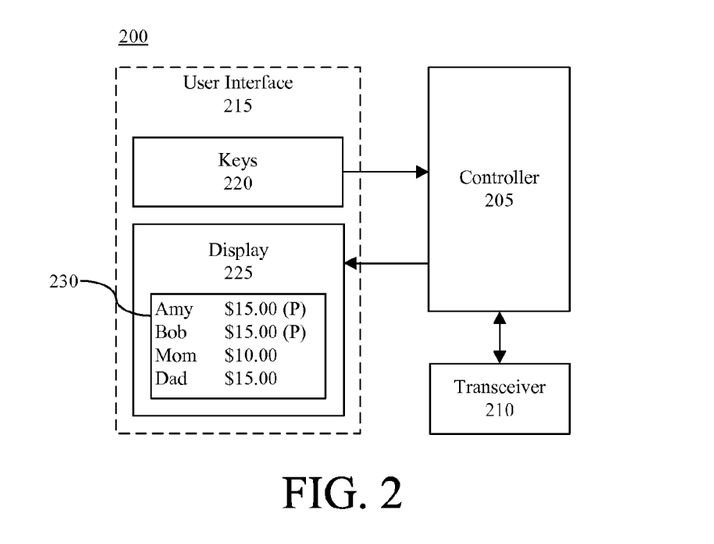
FIG. 2 depicts a communication device that is useful for understanding the present invention.

FIG. 2 depicts a communication device 200 that is useful for understanding the present invention. As shown, the communication device 200 can include a controller 205, a transceiver 210, and a user interface 215. The controller 205 can comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. These components can be coupled together to perform various processing functions as described herein.

The transceiver 210 can modulate and demodulate signals to convert signals from one form to another. The transceiver 210 can receive and/or transmit such signals over various wireless communication networks (not shown). In illustration, the transceiver 210 can be configured to communicate data via IEEE 802 wireless communications, for example, 802.11 and 802.16 (WiMax), WPA, or WPA2. In another example, the transceiver 210 can communicate data via GSM, TDMA, CDMA, WCDMA, or direct wireless communication. Fewer or additional transceivers can be included within the communication device 200. As such, the particular number of transceivers included within the communication device 200 and/or the particular communication protocols used are not intended to limit the present invention.

The transceiver 210 can communicate account information to a network node as well as receive account information from a network node as described with reference to FIG. 1 and throughout the specification. Accordingly, the transceiver 210 can transmit requests to add funds to a prepaid account linked with another user or communication device as well as receive account information pertaining to such other account(s).

The user interface 215 can include one or more keys 220 which can be disposed within a keypad, one or more programmable keys, or both. A programmable key refers to a key that can be used to initiate any of a variety of different programmatic actions within the communication device 200 according to the particular operating state in which the communication device 200 is disposed at the time the programmable key is actuated or activated. The user interface 215 also can include a display 225. Other mechanisms (not shown) for obtaining user input and providing feedback to a user can be provided in the user interface 215. For example, the communication device 200 can include various sensors, audio input and output transducers, etc.

The communication device 200 further can include a data storage device (not shown). The data storage device can include, but is not limited to, a magnetic storage medium, an electronic storage medium, an optical storage medium, a magneto-optical storage medium, and/or any other storage medium suitable for storing digital information such as program code that, when executed, can cause a processor or controller such as controller 205 to execute one or more of the functions described herein. In one arrangement, the data storage device can be integrated into the controller 205, though this need not be the case.

In operation, the transceiver 210, operating under the control of the controller 205, can receive prepaid account information from a network node as well as transmit prepaid account information to the network node. The controller 205 further can cause one or more items of account information to be presented upon the display 225 of the communication device 200. The items of account information can be presented, for example, within a user interface 230.

As shown, the user interface 230 can be presented upon the display 225 of the communication device 200. The user interface 230 can present various items of information relating to a prepaid account associated, or linked with, a different communication device. In one arrangement, the user interface 230 can be implemented as an enhanced address book in which any funds available in the prepaid account that are not allocated to particular users are shown as pooled funds indicated by the symbol "(P)".

A total of $40.00 is available in the prepaid account. The funds are earmarked as indicated in the user interface 230. The users "Amy" and "Bob", not being designated users, are displayed with the total amount of pooled funds being presented next to each name. The pooled funds totaling $15.00 are available for communicating with either "Amy" or "Bob" or any other non-designated user. The user interface 200 further shows that $10.00 of the $40.00 is available and has been allocated to communicating with designated user "Mom". The user interface 200 also shows that $15.00 of the $40.00 is available and has been allocated to communicating with designated user "Dad".

Figure 3:
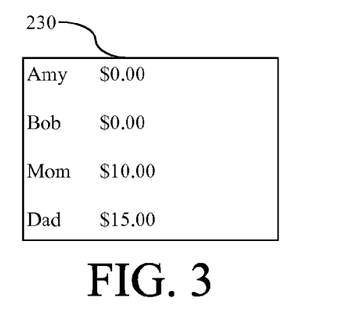
FIG. 3 depicts another view of the user interface shown in FIG. 2 that is useful for understanding the present invention.

FIG. 3 depicts another view of the user interface 230 of FIG. 2 that is useful for understanding the present invention. FIG. 3 illustrates the case in which the user of the communication device linked with the prepaid account has exhausted his or her pooled funds. The user of the communication device can communicate with any non-designated user until such time that the pooled funds are exhausted. The allocated funds for communicating with designated users "Mom" and "Dad", however, are not debited when the user speaks with non-designated users. Accordingly, the user interface 230 still shows available balances of $10.00 and $15.00 for designated users "Mom" and "Dad" respectively. The allocated funds for "Mom" and "Dad" are only debited as a result of communications between the communication device linked with the prepaid account and a communication device or address associated with either "Mom" or "Dad" respectively.

Figure 4:
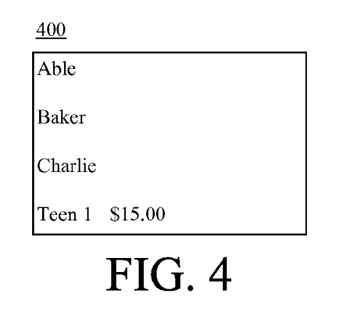
FIG. 4 depicts a view of a user interface for a communication device that is useful for understanding the present invention.

FIG. 4 depicts a view of a user interface 400 for a communication device that is useful for understanding the present invention. The user interface 400 can be presented upon the communication device of the administrative user that issued the request to fund the prepaid account, i.e., the communication device 110 of FIG. 1. For example, the administrative user can be "Dad" as discussed with reference to FIGS. 2 and 3. In this case, the user interface 400 indicates that the prepaid account of Teen 1, who is the user having the prepaid account, still has $15.00 that has been allocated for communicating with designated user "Dad", who, in this case, also can be the administrative user.

Figure 5:
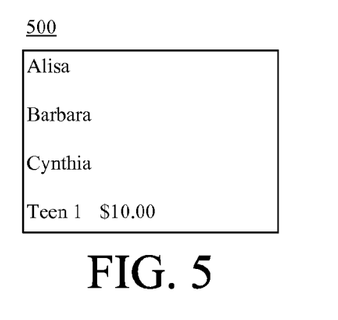
FIG. 5 depicts a view of a user interface for a communication device that is useful for understanding the present invention.

FIG. 5 depicts a view of a user interface 500 for a communication device that is useful for understanding the present invention. In this example, the user interface 500 can be one presented upon a communication device corresponding to the designated user "Mom" as discussed with reference to FIGS. 2 and 3. The user interface 500 indicates that the prepaid account of user "Teen 1" still has $10.00 that has been allocated for communicating with designated user "Mom". In this example, the designated user "Mom" also can be an administrative user.

Figure 6:
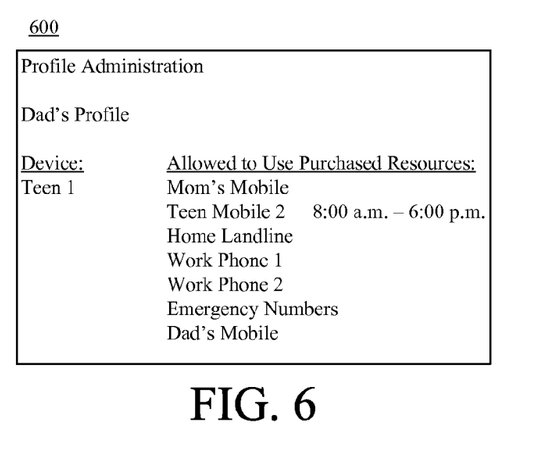
FIG. 6 depicts a view of a user interface that is useful for understanding the present invention.

FIG. 6 depicts a view of a user interface 600 that is useful for understanding the present invention. The user interface 600 presents profile information corresponding to a prepaid account of a different user and/or communication device. The user interface 600 can be presented to a user that has an administrative or supervisory role with respect to one or more prepaid accounts of other users to manage and/or define designated users and/or groups of designated users as the case may be. In one arrangement, the user interface 600 can be presented upon the display of the communication device of the administrative user. In another arrangement, the user interface 600 can be presented through a Web-type interface, such as a browser, where a Web interface is provided over the Internet to the administrative user for interacting with the account manager. In that case, the administrative user also can access the interface via a conventional computer system.

As shown, the administrative user, i.e., the user "Dad", has created a group of designated users. When funds are added to the prepaid account for "Teen 1" by "Dad", such funds will be available to the designated users or group(s) of designated users specified by "Dad". Should the user "Teen 1" desire to communicate with one of the designated users, i.e., "Mom's Mobile", "Teen Mobile 2", "Home Landline", "Work Phone 1", "Work Phone 2", "Emergency Numbers", or "Dad's Mobile", the portion of the available balance in the prepaid account for "Teen 1" that has been allocated to that designated user or the group in which the designated user is a member, will be debited. The pooled funds are not debited in that case.

It should be appreciated that one or more such groups can be defined or created though only one is shown. Further, the designated users can be specified in a hierarchical fashion. In illustration, the designated user "Emergency Numbers" can be another group specifying one or more designated numbers, such as "911", "Fire Rescue", numbers for other relatives, etc. This group can be included within another group as a subgroup.

Accordingly, when funds are added to a prepaid account, the administrative user can specify the particular designated users or groups of designated users to which the funds will be allocated as well as the various amounts allocated to each if more than one designated user or group is specified. As noted, conditions can be attached to particular designated users or groups of designated users. Thus, as shown, the user "Teen 1" may only use the allocated funds for calling the designated user "Teen Mobile 2" during the hours of 8:00 a.m. and 6:00 p.m.

Figure 7:
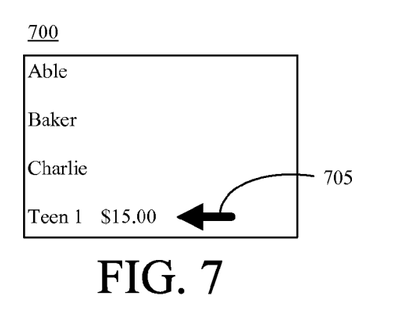
FIG. 7 depicts a view of a user interface that is useful for understanding the present invention.

FIG. 7 depicts a view of a user interface 700 that is useful for understanding the present invention. The user interface 700 can be presented upon the communication device of an administrative user, for example the user "Dad". In this arrangement, an arrow 705 is shown next to the entry corresponding to the user "Teen 1". The arrow 705 indicates that in addition to allocating a portion of the funds of a prepaid account for a particular purpose or calling a particular user, such funds also can be allocated for communications occurring in a particular direction.

The entry for the user "Teen 1" indicates that an amount of $15.00 is reserved in the prepaid account of "Teen 1" for communicating with the administrative user. The arrow indicates that the $15.00 allocation is only to be debited when the designated user, who in this example can be the administrator "Dad", calls "Teen 1". If user "Teen 1" wishes to call the administrative user "Dad", the charges that are incurred will be paid for from the available pooled funds.

Figure 8:
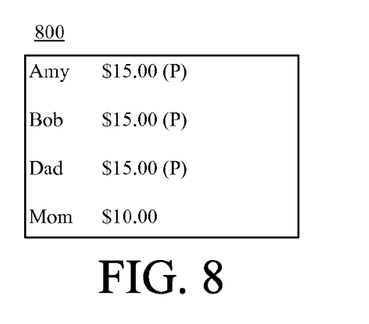
FIG. 8 depicts a view of a user interface that is useful for understanding the present invention.

FIG. 8 depicts a view of a user interface 800 that is useful for understanding the present invention. The user interface 800 can be one that is presented upon the communication device of the user "Teen 1" and further illustrates the directional nature of allocated funds in the prepaid account as discussed with reference to FIG. 7. In this case, since the user "Teen 1" must use pooled minutes to initiate calls to the user "Dad", the available funds are shown as pooled and not as specially allocated funds. Only the user "Mom" is allocated funds from the prepaid account in this example. In this example, a total of only $25.00 is available within the prepaid account.

Referring to FIGS. 7 and 8, it should be appreciated that the administrative user can specify that charges for communications to designated users are only to be applied for communications that take place as either incoming or outgoing communications. For example, the user adding funds to a prepaid account can indicate that the funds are available only for paying for outgoing calls to a designated user, for paying for incoming calls from a designated user, or for both.

Figure 9:
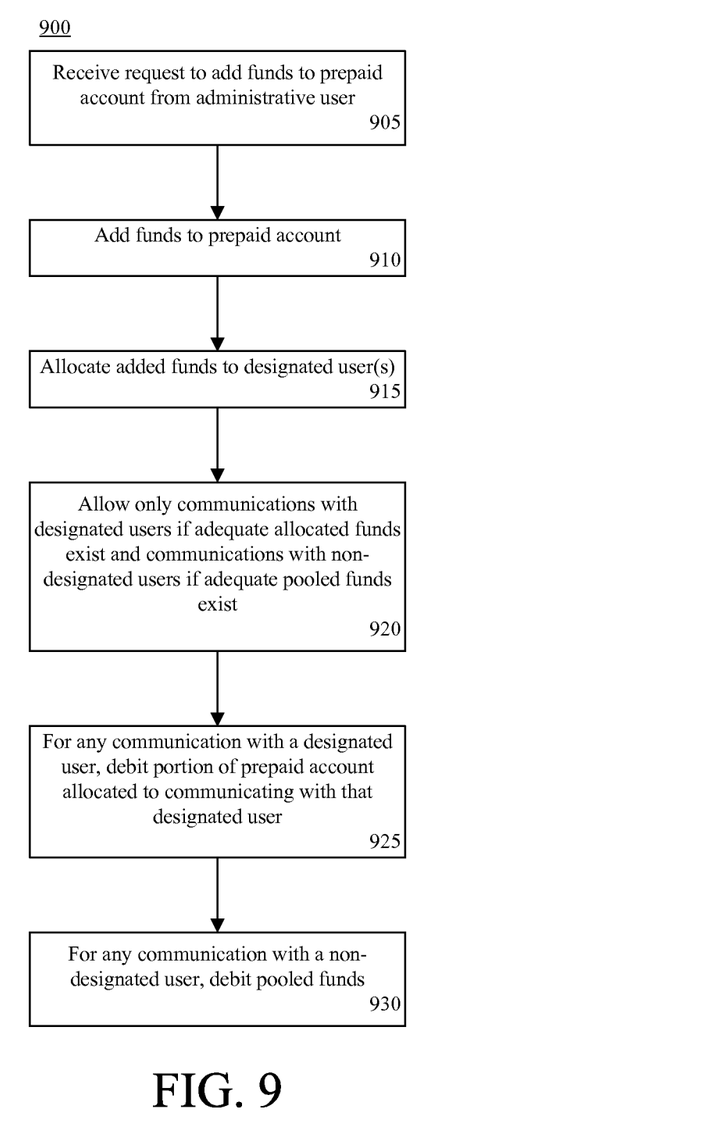
FIG. 9 is a flowchart presenting a method that is useful for understanding the present invention.

FIG. 9 is a flowchart presenting a method 900 that is useful for understanding the present invention. The method 900 can be performed by a system such as the one described with reference to FIG. 1. Further, the method 900 can begin in a state in which an administrative user has specified one or more designated users or groups of designated users for a given prepaid account.

In step 905, a request to add funds to a prepaid account can be received from an administrative user. The request can specify the prepaid account to receive the funds, the amount of money to be added to the prepaid account, as well as the particular designated user(s) to which the funds will be allocated. In step 910, the funds can be added or credited to the prepaid account indicated by the request, thereby increasing the balance of the prepaid account. In step 915, the added funds can be allocated or reserved for the designated user(s) specified in the request.

In step 920, any time a communication is received by or initiated from the communication device linked with the prepaid account, a determination can be made as to whether adequate funds exist in the prepaid account to pay for or support such communication(s). Accordingly, communications with designated users are permitted only if adequate funds have been allocated for such communications and are available for the type of communication being considered, i.e., incoming or outgoing. Communications with non-designated users are permitted only if adequate pooled funds are available. Exceptions can be made for emergency situations, i.e., 911 service, or other special cases if so desired. Those skilled in the art will appreciate that the communications network can send information to the communication device indicating whether the device will be active or not and for which purposes the communication device can be used, i.e., calling designated users, non-designated users, etc.

In step 925, any charges that are incurred as a result of use of the communication device linked with the prepaid account to communicate with a designated user can be debited from the portion of the prepaid account that has been allocated for communications with that designated user. In step 930, any charges incurred as a result of use of the communication device linked with the prepaid account to communicate with a non-designated user can be debited against the pooled funds available in the prepaid account.

The present invention is directed to funding prepaid accounts for communication devices. Funds can be added to prepaid accounts by persons other than the user of the account and, further, can be earmarked or allocated for particular purposes. Accordingly, any funds allocated for particular purposes are only debited when the user of the communication device linked to the prepaid account uses the communication device to communicate in a manner that complies with the particular purpose. Otherwise, the portion of the funds of the prepaid account not allocated and, thus, which are pooled, can be debited.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

This invention can be embodied in other forms without departing from the spirit or essential attributes thereof. Accordingly, reference should be made to the following claims, rather than to the foregoing specification, as indicating the scope of the invention.

What is claimed is:

1. A method of prepaying for usage time for a communication device comprising:
   increasing an available balance of a prepaid account linked to a communication device of a first user by a designated amount responsive to a request from a second user;
   allocating a portion of the available balance of the prepaid account that is attributable to the designated amount for communicating with a designated user; and
   paying charges resulting from communications between the communication device of the first user and the designated user from the allocated portion of the available balance of the prepaid account;
   wherein paying charges further comprises paying charges resulting from communications between the communication device of the first user and the designated user from the allocated portion of the available balance of the prepaid account if at least one additional condition associated with the designated user is met, wherein the additional condition specifies a timing constraint which indicates that the communications may only take place between defined hours.

2. The method of claim 1, further comprising paying charges resulting from communications between the communication device of the first user and a non-designated user only from a portion of the prepaid account not allocated to communications with designated users.

3. The method of claim 1, wherein paying charges further comprises decreasing the allocated portion of the available balance of the prepaid account only for charges incurred from communications initiated either by the first user or the designated user.

4. The method of claim 1, further comprising sending available balance information for the prepaid account to at least one of the communication device of the first user or a communication device of the second user, wherein the available balance information specifies, at least in part, the allocated portion of the available balance that remains in the prepaid account.

5. The method of claim 1, further comprising specifying a designated user as any user having a defined telephone number.

6. The method of claim 1, further comprising specifying a designated user as any user located within a selected geographic area.

7. The method of claim 1, further comprising specifying the second user as the designated user.

8. A method of prepaying for usage time for a communication device comprising:
   increasing an available balance of a prepaid account linked to a communication device of a first user by a designated amount responsive to a request from a second user;
   allocating a portion of the available balance of the prepaid account that is attributable to the designated amount for communicating with a designated user; and
   paying charges resulting from communications between the communication device of the first user and the designated user from the allocated portion of the available balance of the prepaid account; and
   specifying the designated user as any user within a predetermined number of hops of a social network of the first user or the second user, wherein the designated user is within one hop of the first user or the second user when the designated user is listed in an address book of the first user or the second user, and the designated user is within two hops of the first user or the second user when the designated user is listed in an address book of a contact who is listed in the address book of the first user or the second user.

9. A processing node within a communication network comprising:
   an account manager that allocates a portion of an available balance of a prepaid account linked with a communication device of a first user for communicating with a designated user; and
   a data store comprising account information for the prepaid account, wherein the account information specifies the portion of the prepaid account allocated to communicating with the designated user and a portion of the prepaid account that is allocated to communicating with a non-designated user;
   wherein the account manager decreases the portion of the prepaid account allocated to communicating with the designated user according to charges incurred from communications between the communication device of the first user and the designated user, wherein the account manager receives payments for charges resulting from communications between the communication device of the first user and the designated user from the allocated portion of the available balance of the prepaid account if at least one additional condition associated with the designated user is met, wherein the additional condition specifies a timing constraint which indicates that the communications may only take place between defined hours.

10. The processing node of claim 9, wherein the account manager decreases the portion of the prepaid account that is allocated to communicating with the non-designated user according to charges incurred for communications between the communication device of the first user and the non-designated user, and does not decrement the portion of the prepaid account allocated to communicating with the designated user.

11. The processing node of claim 9, wherein the account manager decreases the portion of the prepaid account that is allocated to communicating with the designated user only according to charges incurred for communications initiated either by the first user or the designated user.

12. The processing node of claim 9, wherein the account manager allocates the portion of the prepaid account to communicating with the designated user responsive to a request from a second user.

13. The processing node of claim 12, wherein the account manager sends available balance information for the prepaid account to at least one of the mobile device of the first user or a mobile device of the second user, wherein the available balance information specifies the allocated portion of the available balance that remains in the prepaid account.

14. A communication device comprising:
a transceiver disposed within the communication device receiving an available balance of a prepaid account linked with a different communication device and a portion of the available balance that is allocated to communicating with a designated user;
a display; and
a controller operatively coupled to the transceiver and the display, wherein the controller causes the available balance and the allocated portion of the available balance of the prepaid account to be presented upon the display;
wherein the portion of the available balance allocated to communicating with the designated user is associated with an additional condition, wherein the controller causes an indication of the additional condition to be presented upon the display, wherein the additional condition specifies a timing constraint which indicates that the communications may only take place between defined hours.

15. The communication device of claim 14, wherein the portion of the available balance allocated to communicating with the designated user is available only for communications having a specified origination point, wherein the controller causes an indication of the specified origination point to be presented upon the display with the portion of the available balance allocated to communicating with the designated user.

16. The communication device of claim 14, wherein the controller further causes profile administration information for the prepaid account associated with the different communication device to be presented upon the display.

17. A processing node within a communication network comprising:
an account manager that allocates a portion of an available balance of a prepaid account linked with a communication device of a first user for communicating with a designated user; and
a data store comprising account information for the prepaid account, wherein the account information specifies the portion of the prepaid account allocated to communicating with the designated user and a portion of the prepaid account that is allocated to communicating with a non-designated user;
wherein the account manager decreases the portion of the prepaid account allocated to communicating with the designated user according to charges incurred from communications between the communication device of the first user and the designated user, wherein the designated user as any user within a predetermined number of hops of a social network of the first user or the second user, wherein the designated user is within one hop of the first user or the second user when the designated user is listed in an address book of the first user or the second user, and the designated user is within two hops of the first user or the second user when the designated user is listed in an address book of a contact who is listed in the address book of the first user or the second user.

* * * * *